US012299567B2

(12) United States Patent
Croxford et al.

(10) Patent No.: US 12,299,567 B2
(45) Date of Patent: May 13, 2025

(54) CONVOLUTION SIZE PREDICTION TO REDUCE CALCULATIONS

(71) Applicant: Arm Limited, Cambridge (GB)

(72) Inventors: Daren Croxford, Swaffham Prior (GB);
Sharjeel Saeed, Cambridge (GB);
Rachel Jean Trimble, Grindleford (GB)

(73) Assignee: Arm Limited, Cambridge (GB)

( * ) Notice: Subject to any disclaimer, the term of this patent is extended or adjusted under 35 U.S.C. 154(b) by 905 days.

(21) Appl. No.: 17/479,257

(22) Filed: Sep. 20, 2021

(65) Prior Publication Data
US 2023/0089112 A1 Mar. 23, 2023

(51) Int. Cl.
| | |
|---|---|
| *G06N 3/04* | (2023.01) |
| *G06F 18/10* | (2023.01) |
| *G06F 18/211* | (2023.01) |
| *G06N 3/0464* | (2023.01) |
| *G06N 3/08* | (2023.01) |
| *G06V 10/75* | (2022.01) |

(52) U.S. Cl.
CPC .............. *G06N 3/08* (2013.01); *G06F 18/10* (2023.01); *G06F 18/211* (2023.01); *G06N 3/0464* (2023.01); *G06V 10/751* (2022.01)

(58) Field of Classification Search
CPC ..... G06F 18/10; G06F 18/211; G06V 10/751; G06N 3/0464
See application file for complete search history.

(56) References Cited

U.S. PATENT DOCUMENTS

| | | | |
|---|---|---|---|
| 10,325,179 B1 * | 6/2019 | Kim | G06N 3/08 |
| 2020/0034645 A1 * | 1/2020 | Fan | G06F 18/2413 |
| 2020/0110995 A1 | 4/2020 | Croxford et al. | |
| 2023/0023545 A1 * | 1/2023 | Bass | G06N 3/0464 |

FOREIGN PATENT DOCUMENTS

CN    113408710 A  *  9/2021  .............. G06N 3/04

OTHER PUBLICATIONS

Kim, Cheolhwan, et al. "Mosaic-CNN: A combined two-step zero prediction approach to trade off accuracy and computation energy in convolutional neural networks." IEEE Journal on Emerging and Selected Topics in Circuits and Systems 8.4 (2018): 770-781. (Year: 2018).*

(Continued)

*Primary Examiner* — Hal Schnee
(74) *Attorney, Agent, or Firm* — NIXON & VANDERHYE P.C.

(57) ABSTRACT

There is provided a data processing apparatus for performing machine learning. The data processing apparatus includes convolution circuitry for convolving a plurality of neighbouring regions of input data using a kernel to produce convolution outputs. Max-pooling circuitry determines and selects the largest of the convolution outputs as a pooled output and prediction circuitry performs a size prediction of the convolution outputs based on the neighbouring regions, wherein the size prediction is performed prior to the max-pooling circuitry determining the largest of the convolution outputs and adjusts a behaviour of the convolution circuitry based on the size prediction.

19 Claims, 10 Drawing Sheets

(56) References Cited

OTHER PUBLICATIONS

Ahmadi, Mehdi, et al. "Power reduction in cnn pooling layers with a preliminary partial computation strategy." 2018 16th IEEE International New Circuits and Systems Conference (NEWCAS). IEEE, 2018. (Year: 2018).*

Ujiie, Takayuki, Masayuki Hiromoto, and Takashi Sato. "Approximated prediction strategy for reducing power consumption of convolutional neural network processor." Proceedings of the IEEE Conference on Computer Vision and Pattern Recognition Workshops. 2016. (Year: 2016).*

* cited by examiner

CONVOLUTION SIZE PREDICTION TO REDUCE CALCULATIONS

TECHNICAL FIELD

The present disclosure relates to data processing and could have relevance, for instance, to neural networks.

DESCRIPTION

Convolutional neural network use filter kernels to generate feature maps, often for the identification, classification, segmentation, denoising, and/or enhancement of images, audio, and/or objects within input data. To identify or classify said images/objects a large number of calculations are undertaken. For example, depending on the feature to be identified/classified, a layer within the neural network may use a number of kernels, for example 64, 256 or 512. As a result, each layer within the network may require a large number of multiply accumulate (MAC) calculations to be performed.

SUMMARY

Viewed from a first example configuration, there is provided a data processing apparatus configured to perform machine learning comprising: convolution circuitry configured to convolve a plurality of neighbouring regions of input data using a kernel to produce convolution outputs; max-pooling circuitry configured to determine and select the largest of the convolution outputs as a pooled output; and prediction circuitry configured to perform a size prediction of the convolution outputs based on the neighbouring regions, wherein the size prediction is performed prior to the max-pooling circuitry determining the largest of the convolution outputs and to adjust a behaviour of the convolution circuitry based on the size prediction.

Viewed from a second example configuration, there is provided method of performing machine learning comprising: convolving a plurality of neighbouring regions of input data using a kernel to produce convolution outputs; determining and selecting the largest of the convolution outputs as a pooled output; performing, prior to the max-pooling circuitry determining the largest of the convolution outputs, a size prediction of the convolution outputs based on the neighbouring regions; and adjusting a behaviour of the convolution circuitry based on the size prediction.

Viewed from a third example configuration there is provided a non-transitory computer-readable medium to store computer-readable code for fabrication of a data processing apparatus configured to perform machine learning comprising: convolution circuitry configured to convolve a plurality of neighbouring regions of input data using a kernel to produce convolution outputs; max-pooling circuitry configured to determine and select the largest of the convolution outputs as a pooled output; and prediction circuitry configured to perform a size prediction of the convolution outputs based on the neighbouring regions, wherein the size prediction is performed prior to the max-pooling circuitry determining the largest of the convolution outputs and to adjust a behaviour of the convolution circuitry based on the size prediction.

BRIEF DESCRIPTION OF THE DRAWINGS

The present invention will be described further, by way of example only, with reference to embodiments thereof as illustrated in the accompanying drawings, in which.

DESCRIPTION OF EXAMPLE EMBODIMENTS

Figure 1:
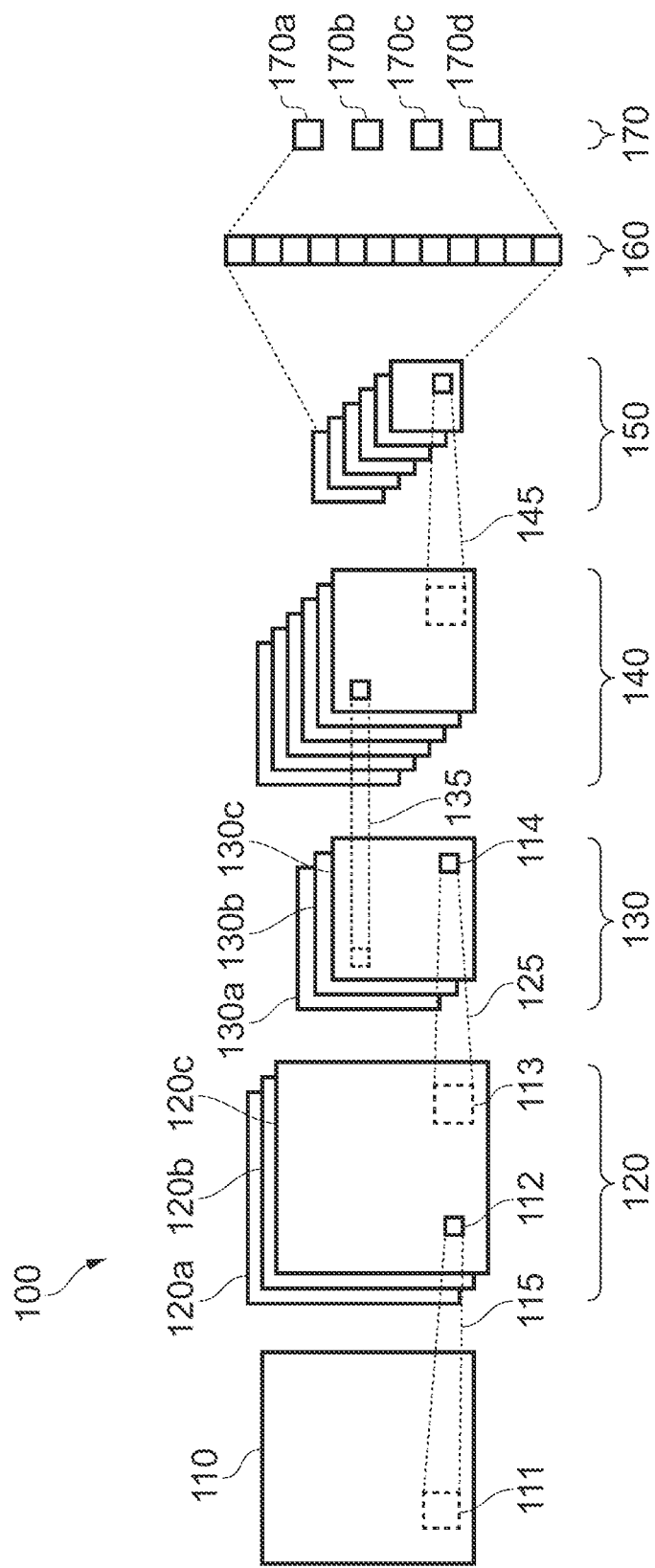
FIG. 1 is a schematic representation of a convolutional neural network (CNN)

Before discussing the embodiments with reference to the accompanying figures, the following description of embodiments is provided.

In accordance with one example configuration there is provided a data processing apparatus configured to perform machine learning comprising: convolution circuitry configured to convolve a plurality of neighbouring regions of input data using a kernel to produce convolution outputs; max-pooling circuitry configured to determine and select the largest of the convolution outputs as a pooled output; and prediction circuitry configured to perform a size prediction of the convolution outputs based on the neighbouring regions, wherein the size prediction is performed prior to the max-pooling circuitry determining the largest of the convolution outputs and to adjust a behaviour of the convolution circuitry based on the size prediction.

In a max-pooling operation, only one of a number of values is taken from a convolution layer to form a pool layer—specifically, the largest of the set of values is taken. This results in 'down-sampling'. A consequence of this is that all of the processing power (and energy) used to convolute the unused values is wasted. In practice, however, it is not necessary to calculate the exact values of the unused feature map elements (elements of neighbouring regions) if it can be determined that they will not qualify as the maximum value. In the above configuration, a prediction is performed regarding which value will be kept in the max-pooling operation and this is used to inform the behaviour of the convolution circuitry that perform the convolutions. The prediction is based on the neighbouring regions—that is, the elements of the input feature map or intermediate feature map. Adjustments to the behaviour can be made in order to control and reduce the amount of processing and amount of energy expended for convolution outputs that are likely to be culled by the max-pooling operation. In this way, wastage of processing and energy can be reduced or eliminated. Note that in these examples, the prediction does not necessitate further convolution operations taking place and instead relies on convolution that has already occurred although of course, multiple predictions may be made, each of the predictions taking place after a different number of convolutions have occurred.

In some examples, the prediction comprises a predicted largest of the convolution outputs; and the prediction circuitry is configured to adjust the behaviour of the convolution circuitry based on the size prediction by an inhibition the convolution circuitry from convolving at least some of the plurality of neighbouring regions other than the predicted largest of the convolution outputs. The convolution circuitry therefore does not perform convolution where the resulting convolution output is likely to be culled by a max-pooling operation. The computational resources (and energy expended on performing those computations) are therefore saved. In some embodiments, the convolution circuitry performs convolution on neighbouring regions that are estimated to produce the largest L of M (where L>M) convolution outputs. For instance, the neighbouring regions that are predicted to produce the largest two convolution outputs may have convolution performed.

In some examples, the data processing apparatus comprises control storage configured to store a control value to control the extent of the inhibition. For instance, the control value may control how many of the plurality of neighbouring regions are convolved. In certain applications, such as Functional Safety (FuSA) applications, it may be desirable to more precisely control the tradeoff between accuracy and energy/processing savings. For instance, it might be more desirable to be more accurate. This can be achieved via such a control value.

In some examples, the data processing apparatus comprises mask storage circuitry to store a mask that indicates entries of the kernel that are at least one of: above a first threshold or below a second threshold, wherein the prediction circuitry is configured to apply the mask to the neighbouring regions and to perform the size prediction for a given neighbouring region based on the mask. Since the mask relates to the kernel, which is fixed, the mask could be precomputed/precompiled. The mask indicates weights in the kernel whose magnitude is particularly large and are therefore likely to have the biggest effect in determining the magnitude/size of the convolution output. Note that the mask itself could refer to the locations that are to be considered or the locations that are not to be considered.

In some examples, the prediction circuitry is configured to perform the size prediction by summing those parts of the given neighbouring region that are above the first threshold and those parts of the neighbouring region that are below the second threshold. By adding up the values in a particular neighbouring region that are outside the thresholds, it is possible to consider only those values that are themselves going to be affected by the larger or smaller weights. The result of this summing is indicative of how large (comparatively) the end convolution output will be for that particular neighbouring region. In some examples, the size prediction may be performed by scaling the parts of the neighbouring region prior to summing them.

In some examples, the prediction circuitry is configured to predict a size order of the convolution outputs; and the prediction circuitry is configured to adjust the behaviour of the convolution circuitry based on the prediction by causing the convolution circuitry to convolve the plurality of neighbouring regions based on the size order descending. By ordering the convolution from a predicted largest to a predicted smallest, the convolution that is most likely to be kept by the max-pooling operation is performed first, with the next most likely candidates being convolved next (computation for some of the predicted smallest values may not even be performed).

In some examples, the prediction circuitry is configured to adjust the behaviour of the convolution circuitry based on the size prediction by halting convolution of a given one of the neighbouring regions when it is determined that a probability of the given one of the neighbouring regions producing the largest of the convolution outputs is below a threshold. At a certain point during the convolution, particularly where convolutions are performed sequentially (e.g. in descending order of predicted output value), it may be determined that one of the neighbouring regions has no chance (or a low chance) of producing a result that will subsequently become the selected value of the max-pool operation. In this case, continuing to perform the convolution on that region is likely to be of little value since it is certain (or probabilistic) that the result will simply be discarded at the max-pool operation. Consequently, by stopping the convolution processing before having completed the convolution, it is possible to reduce computation and energy expenditure. Note that the above process generally may not performed for the first neighbouring regions, since there may be no scope for the probability to be determined.

In some examples, the data processing apparatus comprises: control storage configured to store a control value to control the threshold. In certain applications, such as Functional Safety (FuSA) applications, it may be desirable to more precisely control the tradeoff between accuracy and energy/processing savings. For instance, it might be more desirable to be more accurate. This can be achieved via such a control value.

In some examples, the input data is divided into a plurality of channels; and the convolution circuitry is configured to perform convolution for a set of the channels of one of the neighbouring regions before performing convolution for the channels of other of the neighbouring regions. The channels could represent related but distinct data. For instance, in an image there could be red (R), green (G), and blue (B) channels that represent the red, green and blue pixel values for each pixel in a 2D array of pixels. So for example, each of the three channels could be 16×16 pixels in order to represent each of the red, green, and blue values of 256 pixels. In some examples, the set is a strict subset of the channel and might be one.

In some examples, the probability of the given one of the neighbouring regions producing the largest of the convolution outputs is determined according to those of the channels that have been processed for the given one of the neighbouring regions. As the number of channels that have been processed increases, the amount of data available with which to make a prediction on the likelihood of the given one of the neighbouring regions producing the largest of the convolution outputs increases and so it may be possible to produce a more accurate (or at least a more reliable) prediction. Therefore, by making the prediction based (at least in part) on those channels that have already been processed, it may be possible to produce a good prediction.

In some examples, the probability of the given one of the neighbouring regions producing the largest of the convolution outputs is determined according to convolution previously performed in respect of a previous one of the neighbouring regions. Such a determination can therefore take into account the convolution output for a previous neighbouring region—either a partial result of the convolution output after a number of the channels had been processed or the final result.

In some examples, the previous one of the neighbouring regions is one for which the prediction circuitry predicts that the largest of the convolution outputs will be produced. By performing a comparison between a previous neighbouring region that was predicted to produce the largest convolution output and the current (given) neighbouring region, it is possible to assess the likelihood of the current (given) neighbouring region actually producing the largest convolution output. That is, if the previous neighbouring region was predicted to produce the largest convolution output but the current (given) neighbouring region is on track to exceed that value, then it may be desirable to keep processing the current (given) neighbouring region, since it is likely that it will (despite the initial prediction) produce the largest convolution output, which is then kept by the max-pooling operation. If, however, the current (given) neighbouring region falls far enough behind, it becomes more likely that the initial prediction of which of the neighbouring regions would produce the largest convolution output is correct and therefore the convolution of the current (given) neighbouring region can halt. In some examples, the nature of the activation function associated with the result of the max-pooling operation is taken into account. For some activation functions (e.g. tan h), a large increase in the input value can have very little effect on the output value. Consequently, the threshold could be adaptive based on the activation function so that as the increase in input required to produce the same difference in output increases, the threshold also increases.

In some examples, the previous one of the neighbouring regions is one for which the prediction circuitry predicts that the largest of the convolution outputs will be produced; and the probability of the given one of the neighbouring regions producing the largest of the convolution outputs is determined according to a comparison between a previous partial convolution output for a previous one of the neighbouring regions and a current partial convolution output for the given one of the neighbouring regions. It is therefore possible to consider the likelihood of reaching the convolution output value that was achieved for the previously convolved neighbouring region based on how much convolution processing is still to be performed for the given one of the neighbouring regions. This comparison could feature a like-for-like comparison between the partially produced convolution output of the given one of the neighbouring regions and the partially produced convolution output that had been produced after the same number of channels had been convolved for the previous one of the neighbouring regions. That is to say that if channels 1-6 of 12 have been completed for the given one of the neighbouring regions then the comparison could consider the partially produced convolution output that had been achieved after processing channels 1-6 of the previous one of the neighbouring regions. In some other embodiments, rather than using the previous partial convolution output for a previous one of the neighbouring regions, it is possible to use the final convolution output for the previous one of the neighbouring regions multiplied by the number of the channels that have been completed for the given one of the neighbouring regions. For instance, if the final convolution output was 652 then if channels 1-6 of 12 had been completed for the given one of the neighbouring regions then the comparison could compare the current partially produced convolution output that has been achieved after processing channels 1-6 of the given one of the neighbouring regions to 6/12 multiplied by 652=326.

In some examples, the prediction circuitry is configured to halt convolution of the given one of the neighbouring regions in response to a partial result of one of the convolution outputs of the given one of the neighbouring regions after processing a number of the channels being less than a partial result of another of the convolution outputs of a previous one of the neighbouring regions after processing the number of channels. For instance, consider that in the previous processing of a neighbouring region X after having processed 6 channels, the sum of the values in those channels was A. If, after processing the same 6 channels for neighbouring region Y, the value is B (B<A) then convolution of the neighbouring region Y halts. This is because it is considered unlikely that the result will be such that the neighbouring region Y will be able to produce a largest convolution output. The point (or points) at which this calculation is performed is carefully selected. If the calculation is performed too early, then insufficient data is available with which to make an accurate prediction but any savings that can be made are good. Alternatively, if the calculation is performed late then a lot of data is available with which to make the prediction and so the prediction might be more accurate. However, any computation/energy savings that can be made as a result of halting the convolution are small. Therefore, in some examples, the determination is made after 25% of the channels have been processed or after 50% of the channels have been processed. In some examples, the determination might be made periodically—e.g. after every N channels have been processed.

In some examples, the prediction circuitry is configured to halt convolution of the given one of the neighbouring regions in response to a partial result of one of the convolution outputs of the given one of the neighbouring regions after processing a number of the channels being within a threshold of a partial result of another of the convolution outputs of a previous one of the neighbouring regions after processing the number of channels. In contrast to the above example, rather than performing a strict comparison (B<A), these examples check whether B is within a threshold of A. The threshold could be a constant (e.g. halting occurs if B<A+k), or could be represented as a percentage of A (e.g. halting occurs if B<1.1*A). This variant allows further flexibility to represent the fact that the processing of uncalculated channels is unknown. In the previous example, if the given neighbouring region 'falls behind' and the partial result for the given neighbouring region is not at the same value that had been achieved for the previous neighbouring region then convolution halts. However, this overlooks the fact that channels that are still to be processed could significantly increase the convolution output. Thus, this modification increases the tolerance and requires that for convolution to be halted, the given neighbouring region must fall behind by the threshold amount. In some embodiments, the threshold may be dependent on the layer. In particular earlier layers can be less critical than the later layers with regard to accuracy and therefore the early layers may have a smaller threshold.

In some examples, the prediction circuitry is configured to halt convolution of the given one of the neighbouring regions based on a reachability determination of whether one of the convolution outputs of the given one of the neighbouring regions is able to reach another of the convolution outputs of the previous one of the neighbouring regions after processing a number of the channels. In these examples, when it becomes apparent that the given one of the neighbouring regions cannot produce a convolution output that exceeds a convolution output for the previous one of the neighbouring regions then the processing is halted.

In some examples, the prediction circuitry is configured to perform the reachability determination by counting a number of non-zeros in the channels that have not yet been processed for the given one of the neighbouring regions. As explained above, one way of determining whether a previously calculated value for a neighbouring region can be reached is by considering the number of non-zeros in the channels (e.g. in the input or intermediate feature map or neighbouring regions). These values cannot cause the corresponding convolution output to increase. Since the input or intermediate feature map typically differs each time, the use of these maps (rather than, for instance, the kernel) can provide a more accurate estimate of whether the convolution for a particular neighbouring region is likely to reach a previously calculated value. In some examples, of course, both the kernel and the input/intermediate feature map could be considered and the number of positions for which a zero is present in either the kernel or the input/intermediate feature map is counted. That is to say that both the zeros in the kernel and the neighbouring regions are taken into account, but where there is a zero for an element in both the kernel and the neighbouring region, only one of the zeros is counted.

In some examples, the prediction circuitry is configured to determine the size prediction by using a magnitude prediction neural network to analyse the neighbouring regions. In these examples the magnitude prediction neural network could therefore be trained to determine, from the neighbouring regions, which of the neighbouring regions was most likely to produce the value that would be taken by the max-pooling operation. Clearly such a neural network would be sufficiently small that the prediction can be performed quickly, otherwise, any potential saving from terminating the convolution process early is lost from the time taken to use the magnitude prediction neural network to perform the analysis.

Particular embodiments will now be described with reference to the figures.

Convolutional neural networks typically comprise an input layer, a plurality of convolutional layers, a number of fully connected layers and an output layer. The input layer corresponds with an input to the neural network, such as input data. The convolutional layers are arranged to extract particular features from the input data to create feature maps and may only operate on a small portion of the input data. The fully connected layers then use the feature maps for classification.

FIG. 1 is a schematic representation of a convolutional neural network (CNN) 100. The CNN 100 includes a number of different layers 110, 120, 130, 140, 150, 160, 170. The CNN 100 may include an input layer 110, a plurality of convolutional layers 120, 140, a plurality of pooling layers, 130, 150, a number of fully connected layers 160, and an output layer 170. In this example, the input layer 110 corresponds to an input to the CNN 100 such as input data.

The input data 110 may, for example, be 224 pixels wide and 224 pixels high, and include 3 color channels (such as a red, a green and a blue color channel), The input data may undergo convolutions by the convolution layer 120 (as described below in relation to FIG. 3). The convolutional layer 120 typically extracts features from the input data to create feature maps or activation maps 120a, 120b, 120c. A region 111 of the input data is shown schematically undergoing convolution 115 to create an output 112. Convolutional layers 120, 140 may contain filters or kernels that are used to extract particular features from the input data. Each kernel of the convolutional layer 120 will produce a corresponding activation map 120a, 120b, 120c. The activation maps 120a, 120b, 120c of the convolutional layer 120 may then undergo pooling 125 before they are input into a second convolutional layer 140. Pooling 125, for example, allows values for a region of the input data or of an activation map 120a, 120b, 120c to be aggregated or combined. A region 113 of the activation map 120c is pooled 125 to create a pooled output 114.

Other such pooling procedures may be used, such as an average pooling or L2-norm pooling. Regardless of the pooling procedure used, pooling 125 may reduce the amount of computation for subsequent layers of the CNN 100. This is shown schematically in FIG. 1 as a reduction in the size of the activation maps 120a, 120b, 120c of convolutional layer 120 compared to the pooled activation maps 130a, 130b, 130c of the pooling layer 130.

After the input data has been processed by the convolutional layer 120 and the pooling layer 130, the CNN 100 may process the input data by using further convolutions, such as 135, by further convolutional layers, such as 140, and pooled 145 by further pooling layers, such as 150.

Whilst only two convolutional layers 120, 140 and pooling layers 130, 150 are shown in FIG. 1 for simplification, it will be appreciated that a CNN 100 may have a greater number of layers and be significantly more complex.

After the convolutional 120, 140 and pooling layers 130, 150, a fully connected layer 160 uses the activation maps of the last layer (in this example pooling layer 150) for classification. The activation maps from the convolutional 120, 140 and pooling layers 130, 150 represent high level features of the input data. The fully connected layer 160 uses the features to classify the input data into various outputs 170a, 170b, 170c, 170d. The fully connected layer 160 may use an activation function.

In general, neural networks, such as the CNN 100 of FIG. 1, described above, may undergo a training phase in which the neural network is trained for a particular purpose. In an illustrative example, the CNN 100 of FIG. 1 may be used to identify animals from photos. Given an input image of a photo of an animal, the CNN 100 can be used to classify the animal into one of four categories e.g. elephant 170a, tiger 170b, swan 170c or horse 170d. After processing the photo 110 with the CNN, the output probability for each category may be as follows: elephant 0.01, tiger 0.94, swan 0.04, horse 0.01. As such, the photo of the animal is categorized as a photo of a tiger.

A neural network, such as the CNN 100 of FIG. 1, may comprise a number of interconnected nodes, which may be referred to as artificial neurons, or neurons. The internal state of a neuron within the neural network (sometimes referred to as the activation) typically depends on an input received by the neuron, the weights, bias and type of activation function. The output of said neuron then depends on the input, kernel bias, and the activation. The output of some neurons is connected to the input of other neurons, forming a directed weighted graph in which edges (corresponding to neurons) or vertices (corresponding to connections) of the graph are associated with weights, respectively. The weights and bias may be adjusted throughout the training phase altering the output of individual neurons and hence of the neural network as a whole.

When training neural networks one or more kernels are generated. The kernels are associated with at least some of the layers of the network. The kernels, for example, allow features of an image or other data to be identified. Some kernels may be used to identify edges in the input and others may be used to identify horizontal or vertical features in the input data (although this is not limiting, and other kernels are possible). The precise features that the kernels identify will depend on the object that the neural network is trained to identify. In some embodiments, kernels may be three dimensional volumes having a width, height and depth, for examples 3×3×64.

Each of the kernels comprise a plurality of weights. During the training of the neural network, the weights of each kernel are determined. Each of the weights are adjusted so as to enable the kernel in the neural network to identify a particular feature of an input. Similarly, during the training phase, a bias may be generated. The bias may be added to the results of the kernel prior to being sent to the activation function.

Figure 2:
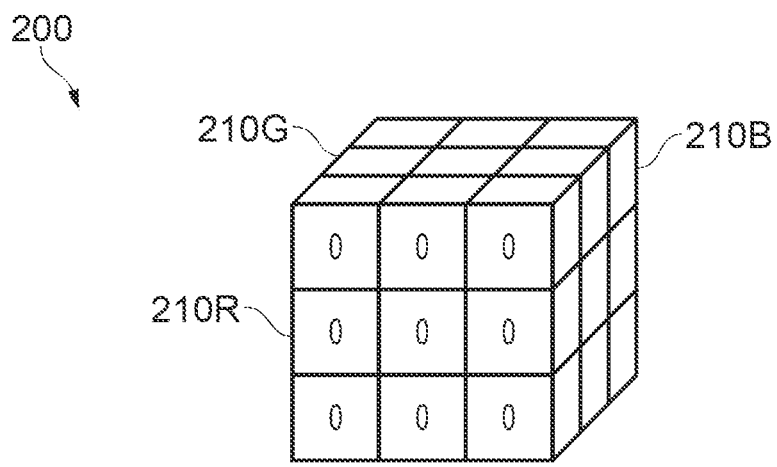
FIG. 2 shows an example kernel generated by a training process.

FIG. 2 shows an example kernel 200 generated by a training process. The kernel 200 is a 3×3×3 kernel which may be used, for example, for detecting a blue vertical line in an input image. The kernel 200 comprises three channels, a first channel 210R, a second channel 210G, and a third channel 210B, for detecting features in a red layer, a green layer, and a blue layer, respectively, of an input image. The kernel 200 may be used to generate output feature maps in a layer of a CNN, such as CNN 100 of FIG. 1. To generate an output feature map which will be used as an input into subsequent layers of the neural network, 27 multiply accumulates operations (i.e. 3×3×3=27) will be performed to compute a single output feature map. There may be multiple output feature maps generated at each layer of the CNN 100.

As a result of the training a large number of kernels may be produced. For example, as mentioned above, there may be upwards of 512 kernels, although it will be appreciated that there may be more or fewer kernels. To identify/classify an input or portions of an input, each kernel will be used to identify particular characteristics of an input.

Figure 3:
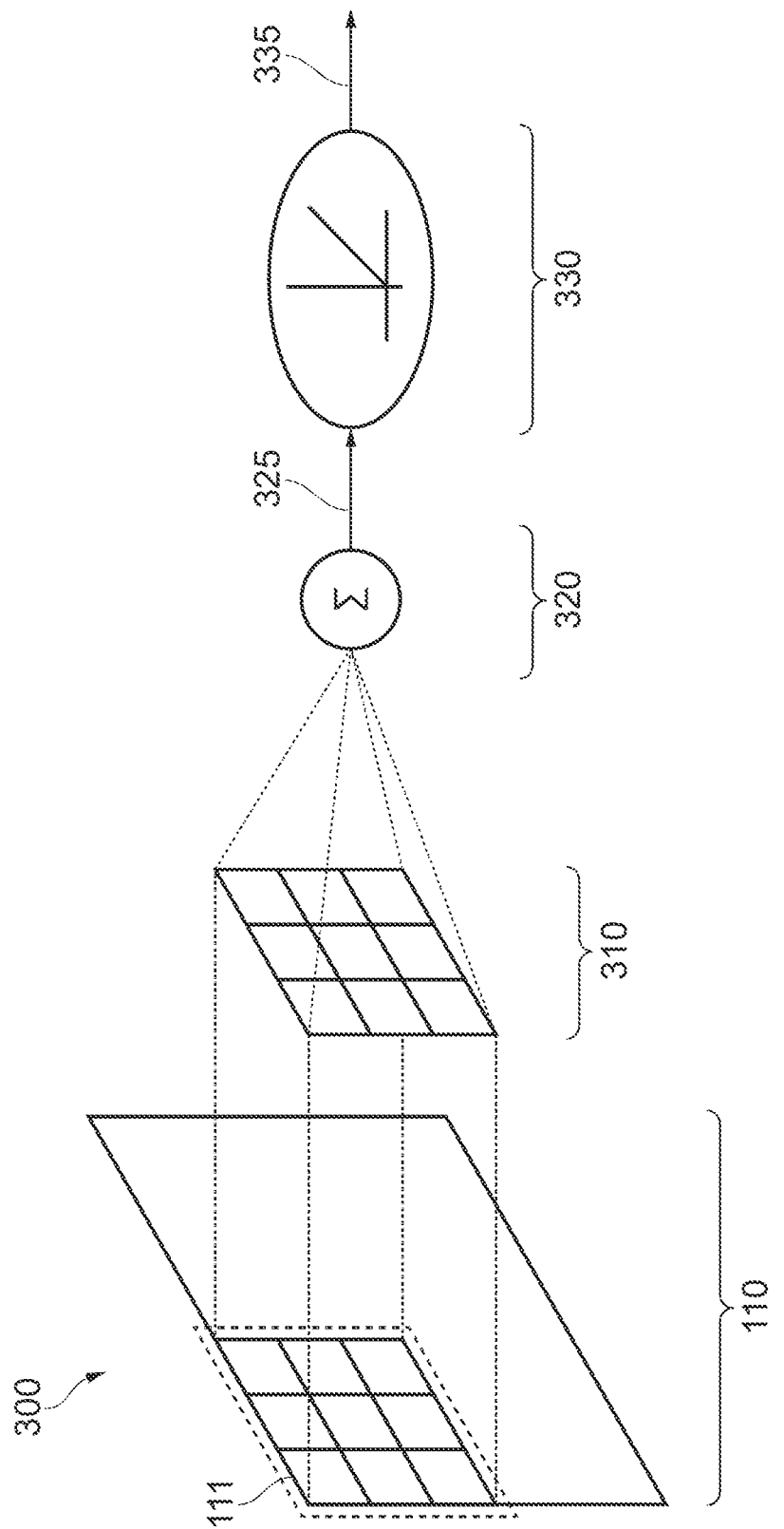
FIG. 3 is a schematic representation of the function of a neuron in a CNN.

FIG. 3 is a schematic representation 300 of the function of a neuron in a CNN, such as CNN 100 of FIG. 1. Multiple neurons may make up a convolutional layer 120, 140 in a CNN 100. A neuron may comprise a filter or kernel 310, a multiply-accumulate (MAC) function 220, a bias function, and an activation function 330. The input to the neuron may be an input image or other data from the input layer 110, alternatively the input may be a region of the input data 111, an input feature map 120a, 120b, 120c, or a pooled input feature map 130a, 130b, 130c from a previous pooling layer 130.

The kernel 310 allows features of the input data to be identified. For example, some of the kernels 310 may be used to identify edges in the input data represented by the input data and other may be used to identify horizontal or vertical features in the input data (although this is not limiting and other kernels are possible). The precise feature that a kernel will identify depends on the object the CNN 100 is trained to identify. The kernel of FIG. 2 is for example a 3×3 matrix, which may be convolved with the input data region 111 of the input data with a stride of 1. Convolution of the input data region 111 with the kernel 310 allows for the identification of features the kernel 310 is designed to detect. Note that in this example, the kernel 310 is 2D. However, it is common for the kernels to be 3D. A 3D version of this kernel 310 would be 3×3×N (N>1).

Convolution generally involves multiplying each input data item or input feature map of an input, or input region 111 (in this example a 3×3 input data region) by a weight in the kernel 210 before adding the result of this operation to the result of the same operation applied to neighboring pixels, or neighboring feature map elements. A stride, for example, refers to the number of pixels or activation map elements a kernel 310 is moved by between each operation. A stride of 1 therefore indicates that, after calculating the convolution for a given 3×3 input data region, the kernel is moved across the input by 1 pixel and the convolution is calculated for a subsequent input region. This process may be repeated until the kernel has been convolved with the entire input data region, the entire portion of the input data for which a convolution is to be calculated, or with the entirety of an activation map the kernel 210 is to be convolved with. A convolution generally involves a multiplication operation and an addition operation (sometimes referred to as an accumulation operation). Thus, a neural network accelerator, may include a multiplier-accumulator (MAC) unit configured to perform these operations.

In some embodiments, the input data and/or input feature map may have multiple channels. In this case, the kernels of a neural network for processing such input data may also have multiple channels. For example, if the input data has 64 channels, then a kernel of a neural network for processing such data may be a 3×3×64 kernel. To compute the output feature map, the neural network will first undertake a multiply-accumulate operation on the first channel of the kernel with the first channel of the input data/input feature map. Each subsequent channel with then be computed accumulating the results until all channels are processed. In some embodiments, a bias may then be added to the output, and the result will be provided as an input to an activation function.

In the example of FIG. 3, the input data region 111 of the input data 110 is multiplied with the weights of the kernel 310 before accumulation 320. The resulting value 325, which may be referred to as an input value 325, may then be input into an activation function 330. As mentioned above, a bias generated during the training process may be added to the input value 325 prior to being input into the activation function 330.

The input value 325 is passed through the activation function 330, creating an activation output value 335. The activation function 330 of the neuron determines whether the neuron 'activates'. For example, the neuron will only activate if the kernel 310 convolving the input data region 111 has identified the features the kernel 310 is looking for. As such, the multiplying and accumulating 330 will result in a high convolution output value which will provide a positive input 325 to the activation function 330. This results in a non-zero activation output value 335.

In another example, the kernel 310 convolving the input data region 111 does not identify the features the kernel 310 is looking for. As such, the multiplying and accumulating 320 will result in a low or negative input value 325 to the activation function 330. This results in an activation output value 335 of zero i.e. the neuron is not 'activated'.

An activation function (sometimes referred to as a rectifier) may be used to map an input to a predefined output, such as a value which is zero or greater. The activation function may be used to increase the nonlinear output of the neuron and is therefore often a non-linear function. Examples of activation functions include a sigmoid function, a hyperbolic tangent function or rectified linear unit (ReLU) function (schematically shown in the activation function 330 in FIG. 3), although other activation functions are possible. Using some activation functions may result in the amount of data to be processed being reduced (as some inputs may be mapped to 0, and therefore may not require further processing). Furthermore, the output data after application of an activation function may contain a large number of zeros and small values, the data can then be compressed, reducing memory access and memory bandwidth.

Referring back to the example in FIG. 1, the convolutional layer 120 may involve the convolution of 64 different kernels with the input data 110 of the first layer. Each of the 64 kernels is for example arranged to identify a different respective feature of the input data. In the example of FIG. 1, whereby the convolutional neural network is used to identify animals from photos, the 64 kernels of convolutional layer 120 may be used to identify features such as lines, curves, edges etc. Further convolutional layers, such as 140, may be used to identify more sophisticated features, based on the combined features of those identified in the previous layer 120 e.g. trunk, paws, beak, mane etc. Therefore, as the input data 110 is processed by the convolutional neural network 100, different kernels will be activated depending on which features are identified. The fully connected layer 160 may then use the features identified by the kernels to classify the input data 110 into various outputs e.g. elephant 170*a*, tiger 170*b*, swan 170*c*, horse 170*d*.

In the example of FIG. 1, in which the input data is an image of 224×224 pixels, with 3 color channels, and is convolved with 64 kernels of a size of 3×3 weights, the convolutional layer 120 of the convolutional neural network 100 involves 224×224×3×(3×3)×64 multiply-accumulate operations, i.e. 86 million multiply-accumulate operations. There will also be a large number of further multiply-accumulate operations associated with further convolutional layers 140 of the convolutional neural network 100, which involve convolving the output of the previous layer 130 with e.g. 256 kernels. As will be appreciated, though, other neural networks may involve convolutions with a different number of kernels. Nevertheless, classification of an image using a neural network typically involves a large number of data processing operations, each of which consumes power. Reduction of the number of data processing operations, while still retaining the same classification accuracy and efficiency, may save processing power.

Figure 4:
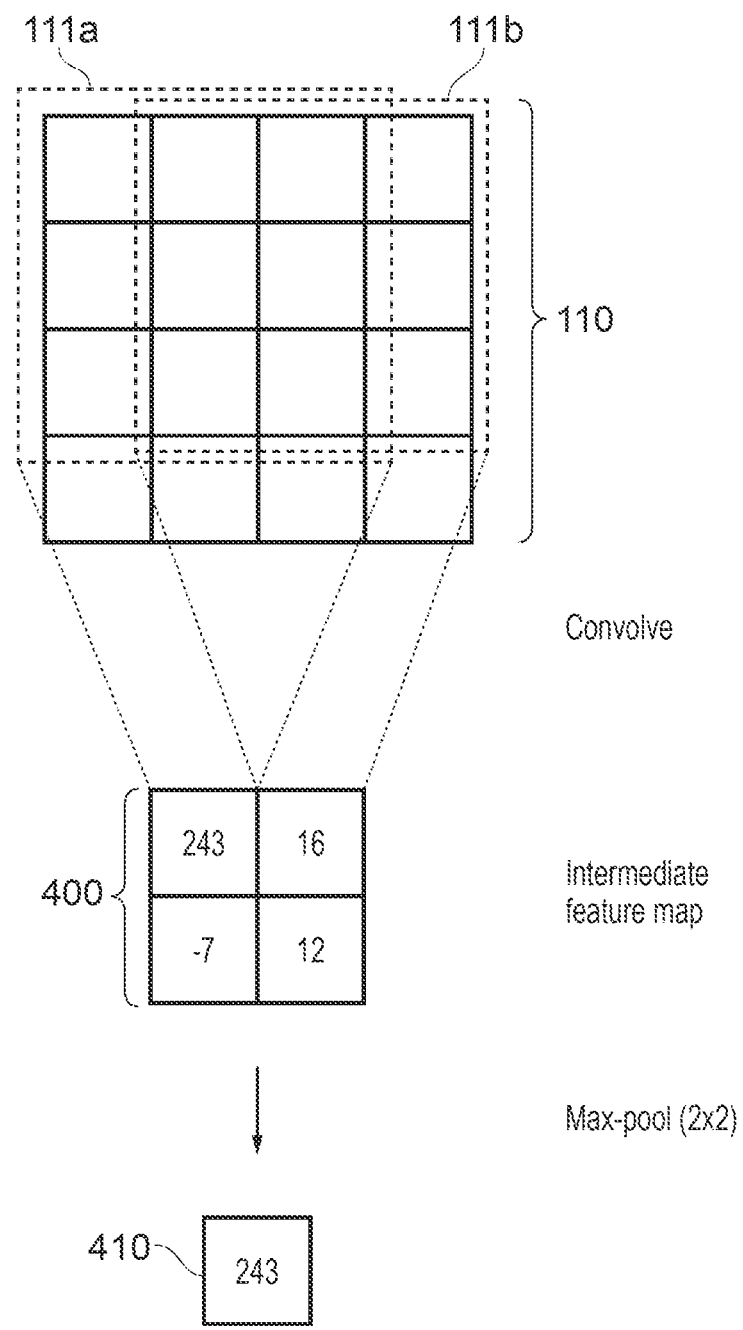
FIG. 4 shows an example of a convolution operation followed by a max-pooling operation.

FIG. 4 shows an example of a convolution operation (similar to that already shown) followed by a max-pooling operation. Here, the input data is separated into a number of input data regions 111*a*, 111*b*. Four such regions exist in this example (although only two are shown, for clarity). These are convolved with a 3×3×1 kernel in the manner previously described and the resulting 2×2 intermediate feature map 400 is produced. A max-pooling operation is then performed on a 2×2 area, which in this case happens to exactly match the size of the intermediate feature map 400. The max-pooling operation downscales the intermediate feature map so that the maximum value in (in this case) each 2×2 area is kept and other values are discarded. The resulting intermediate feature map 410 is therefore made of the singular value (243). It will be appreciated that if the intermediate feature map 400 produced from the convolution operation was larger, then the result of the max-pooling in this example would also be larger.

A consequence of the max-pooling operation is that the processing power and energy expended on performing the convolutions that produced the output values 16, −7, and 12 is essentially 'wasted' since those values are not carried forward. The present technique considers the weights in the input data regions 111*a*, 111*b* and attempts to predict which of these will produce a value that is kept by the max-pooling operation before the convolution is performed. Other regions may not be convolved at all, or may only have some channels convolved until it is determined with higher likelihood that the resulting output value will not be kept by the max-pooling operation.

Figure 5:
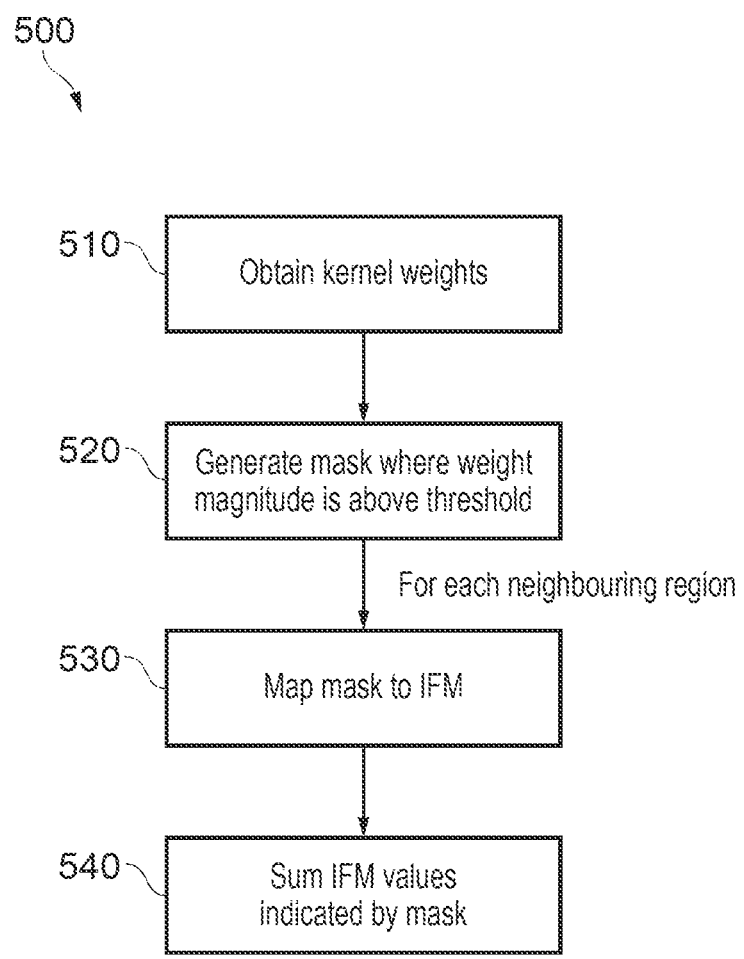
FIG. 5 shows a flowchart that illustrates a method for making a size-prediction of the convolution outputs using the input data regions/neighbouring regions.

FIG. 5 shows a flowchart 500 that illustrates a method for making a size-prediction of the convolution outputs using the input data regions/neighbouring regions 111. In this example, the prediction does not predict the actual convolution outputs themselves, but instead produces a heuristic that is used to predict which of the neighbouring regions 111 will be taken forward by the max-pooling operation. The process starts at a step 510 where the set of kernel weights are obtained. At a step 520, a mask is then generated. The mask is generated based on a magnitude of the kernel weights. In some examples, this could be where the magnitude of the kernel weight is above a threshold. In other examples, it could be where the weight of the kernel value is above one threshold or below a second threshold (with the two thresholds being different). In any event, having generated the mask, the mask is mapped to the input feature map or intermediate feature map at step 530. Then, the values indicated by the mask are summed at step 540.

Note that the mask could be used to select certain values or to deselect certain values. In this example, the mask is used to sum the values of the IFM that match those weights of the kernel whose magnitude is above a threshold. In this way, the sum is made of values in the input/intermediate feature map whose location matches a location in the kernel with a large magnitude weight. The sum is therefore made of values in the input/intermediate feature map that are likely to be affected by large values in the kernel.

Figure 6:
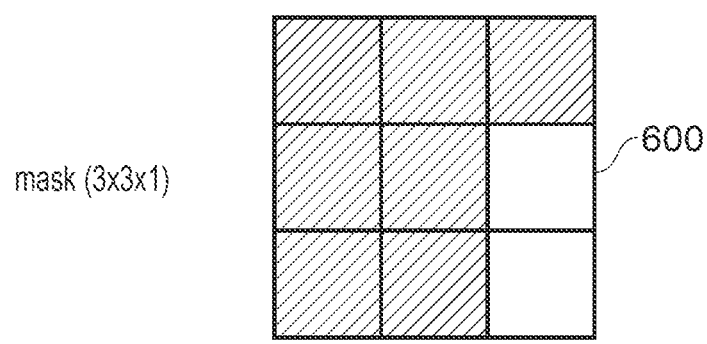
FIG. 6 shows a worked example of the process described with reference to FIG. 5.

FIG. 6 shows a worked example of the process described with reference to FIG. 5. A kernel 610 is provided, for which a mask 600 is generated. In this example, the mask 600 is used to identify values that are greater than 190 and less than −200. This therefore indicates the values 191 and −201. As described already, the definition of 'mask' can be said to either include values or exclude values. However, in these examples, the mask 600 is used to indicate positions in the kernel where the values are above 190 and less than −200 in the kernel. This mask 600 is then applied to three neighbouring regions 620, 630, 640, which could be previously described input data regions 111 (which are subsections of an input feature map 110) for instance. In any event, for a neighbouring region A 620, the mask identifies the values 200 and −105. When these are summed, they give a total of 95. For a neighbouring region B 630, the mask identifies the values 7 and −31, which when summed give −24. Finally for a neighbouring region C 640, the mask identifies the values 7 and −12, which when summed give −5. The prediction would therefore be that neighbouring region A 620 is most likely to produce the highest output value and therefore most likely to be selected by a max-pool operation. A size order can also be predicted in that neighbouring region A 620 would be expected to produce the biggest output, followed by neighbouring region C 640, followed by neighbouring region B 630.

Based on the prediction or predictions, a behavior of the system can then be changed.

In some examples, only those neighbouring regions that generate the best predictions (e.g. neighbouring region A 620) are processed. In some examples, all neighbouring regions whose prediction scores above a threshold are processed. In some examples, one of these two options might be followed, and the best neighbouring region(s) are processed. Processing of the other (predicted sub-optimal) neighbouring region(s) (e.g. neighbouring regions B 630 and C 640) can be started (e.g. in descending order of prediction) and further predictions made over time. Convolving of those neighbouring regions can then be halted once the predictions are more conclusive that the convolutions will not yield a result that will be taken forward by the max-pooling operation. In some cases, control storage can be used to store any of these above parameters such as the number of neighbouring regions taken forward, the thresholds, the degree of certainty needed to not process the neighbouring regions that are believed to be sub-optimal, and so on.

Figure 7:
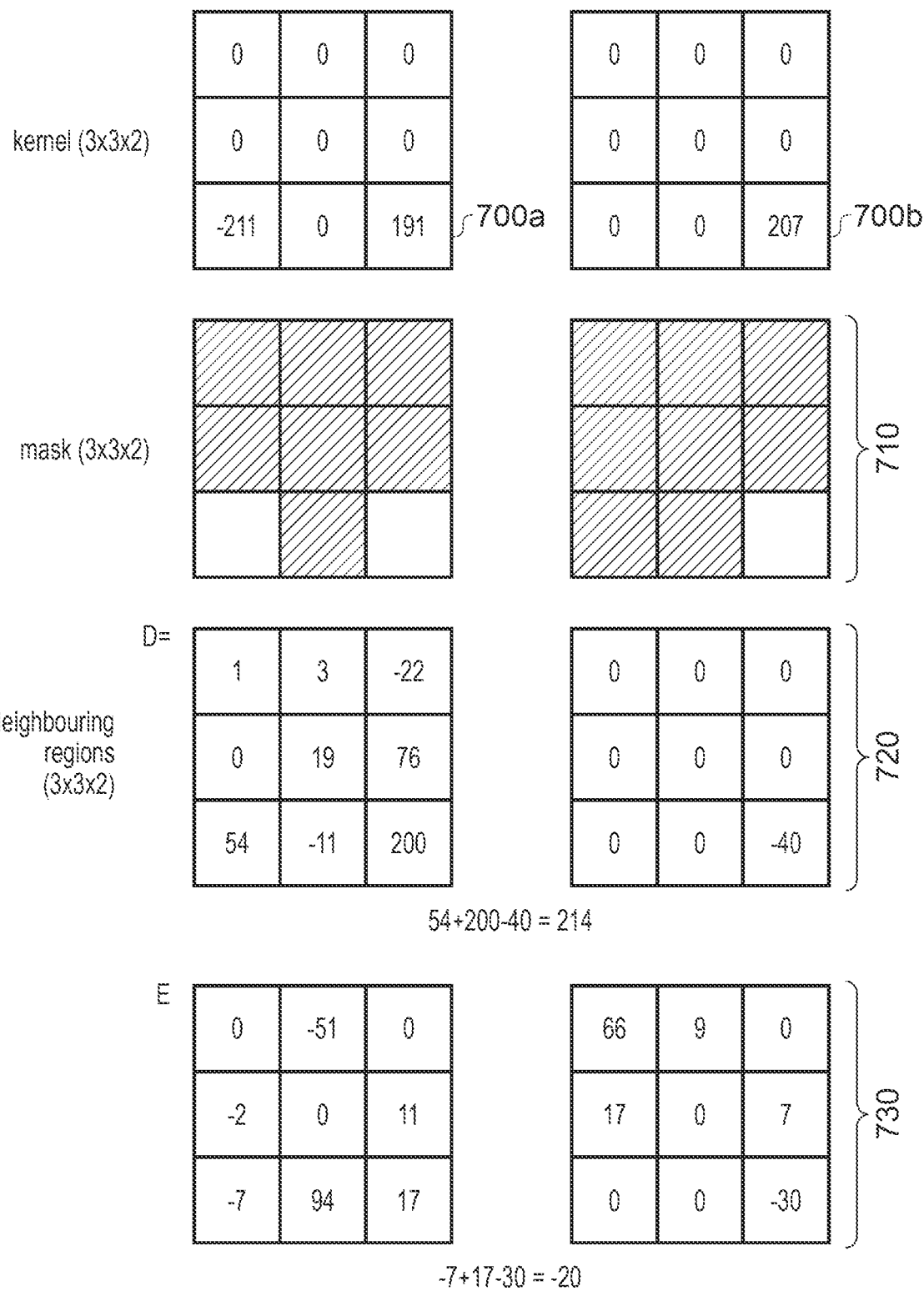
FIG. 7 shows an example where the convolution involves multiple channels.

FIG. 7 shows an example where the convolution involves multiple channels (in this case, two channels). The kernel is therefore a 3×3×2 kernel made up of a first channel 700a and a second channel 700b. A 3×3×2 mask 710 is therefore also generated for the kernel in which, again, values over 190 and under −200 are identified. The mask 710 is then applied to neighbouring regions (again 3×3×2). In this case, all of the values identified by the mask across both channels are summed together. Therefore for a neighbouring region D 720, the prediction is made from the calculation of 54+200−40=214. Meanwhile, the prediction for neighbouring region E 730 is made up from the calculation of −7+17−30=−20. The prediction therefore indicates that the max-pool operation is likely to proceed with neighbouring region 214 (here we are assuming a max-pool operation of 1×2 or 2×1).

Figure 8:
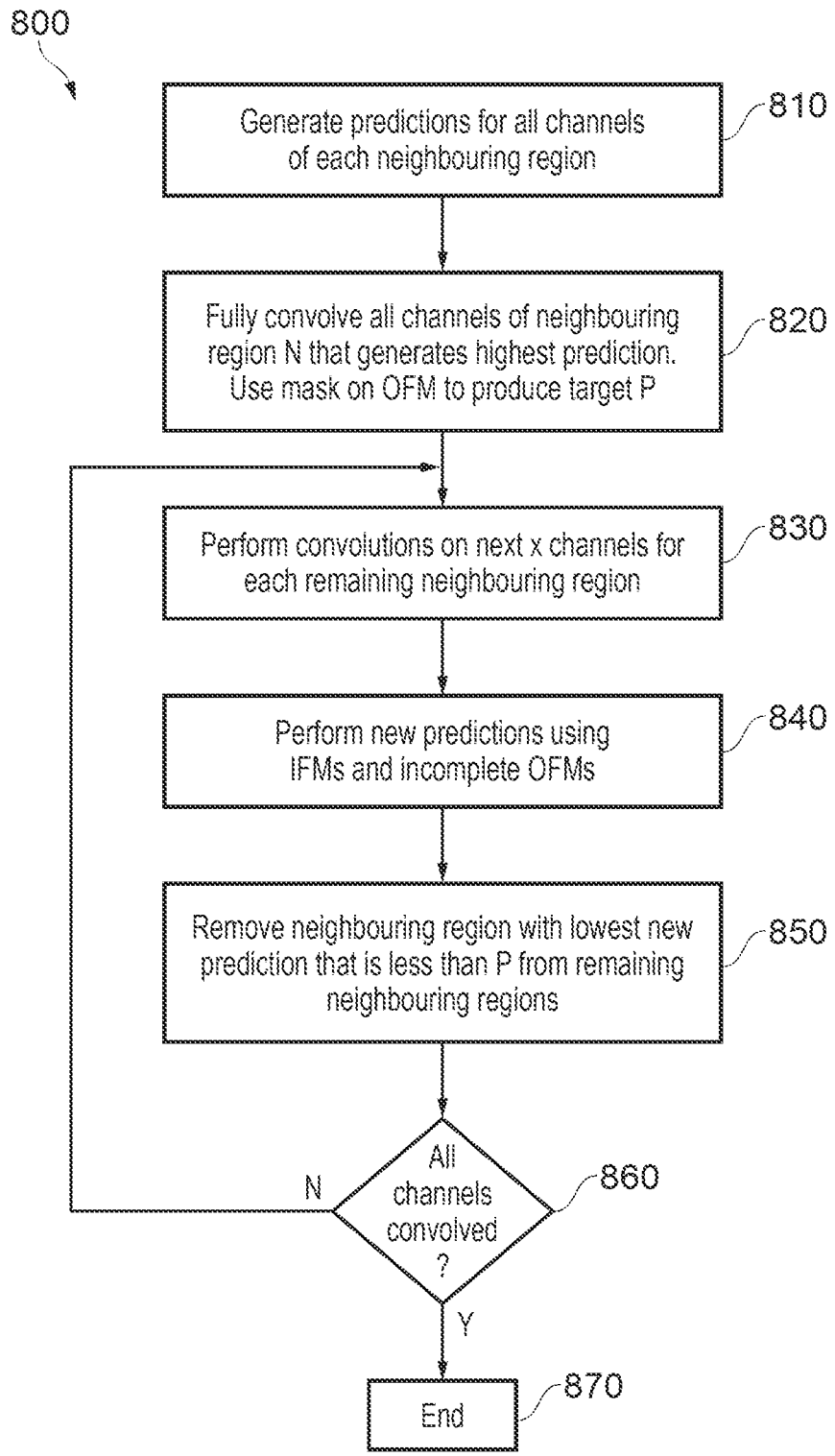
FIG. 8 shows a flowchart that illustrates a process of continually performing predictions and proceeding with convolution of a decreasing set of neighbouring regions.

FIG. 8 shows a flowchart 800 that illustrates a process of continually performing predictions and proceeding with convolution of a decreasing set of neighbouring regions. The process starts at a step 810 where an initial prediction is made (as shown in FIG. 7) for all neighbouring regions across all channels. Based on this prediction, at a step 820 the neighbouring region that produces the highest heuristic (e.g. summed value) is then fully convolved. This is the neighbouring region that is (initially) expected to be taken by the max-pool operation. The mask is then used to calculate a target P, which is the sum of all values in the output feature map for the neighbouring region that are indicated by the mask. This is therefore produced in a similar way to the process shown in FIGS. 6 and 7 except that it is performed on the actual output feature map rather than the input feature map. Then, at step 830 a set of remaining neighbouring regions is formed, which decreases over time. At step 830, the next set of x channels are convolved for all neighbouring regions in the set of remaining neighbouring regions. Here, x is equal to the total number of channels, divided by the total number of neighbouring regions. So if there are 100 channels and four neighbouring regions then x is 25. Therefore a further 25 channels of each of the neighbouring regions is convolved. At a step 840, new predictions are formed. These predictions are similar to those performed in FIGS. 6 and 7. However, the sum is instead made up by adding together values that are indicated by the masks for unconvolved channels. To this, values from the partial output feature map (OFM) that have been generated from the convolved channels and are indicated by the mask are added. In other words, the prediction takes into account the convolutions that have already been performed and then for the unconvolved channels, makes a prediction as per FIG. 7. The result is a value that will generally tend (over time) towards the final convolution result for each neighbouring region. At a step 850, the neighbouring region having the lowest new prediction is removed from the set of remaining neighbouring regions, provided that region is lower than P. At step 860, it is determined whether all channels have bene convolved. If not, the process returns to step 830 where the next x channels are convolved. Otherwise, at step 870 the process ends.

Within this process, the neighbouring region that is initially predicted to perform the best is fully convolved and a target value is produced. At each iteration of the loop, more of the prediction is replaced by convolution and therefore the prediction grows more accurate. However, convolution is performed for a decreasing set of neighbouring regions thereby saving processing power. At any stage, if it appears that the prediction generated for a different neighbouring region D might exceed P (the initial target) then it is possible that contrary to the initial prediction, D might be the result taken forward by the max-pool operation. Such neighbouring regions are kept. Otherwise, the worst performing neighbouring region is eliminated.

As a variant of this example, at a step 820, an estimate could be calculated after every x channels have been convolved, as takes place for steps 830 and 840. These target values $P_x$, $P_2x$, $P_3x$, . . . , Pnx can then be used for comparison in step 850. So after 2x channels have been convolved, the target value $T_{2x}$ is used in step 850. The comparison thereby performs a comparison against how well the 'best initial prediction' was doing at each stage and uses this to determine whether to continue with convolution of that neighbouring region or not.

In a further variant, rather than removing the worst performing prediction, step 850 removes any and all predictions that do not meet a threshold (which could be P itself). For instance, step 850 could remove all predictions that do not meet a percentage of P that is equal to the percentage of channels that have been convolved so far (possibly scaled by a further factor to give neighbouring regions a chance to 'catch up').

In some examples, P can be modified by an adjustment factor or threshold. By doing this, the system can be made more tolerant (if P is multiplied by a number smaller than 1) and therefore more prone to keeping neighbouring regions or less tolerant (if P is multiplied by a number larger than 1) and therefore more prone to deleting neighbouring regions. Again, this threshold can be stored in control storage and can therefore be modified depending on the application being executed. For instance, more safety-critical application may desire the threshold to be lower so that they can be more certain that the optimal value has been taken by the max-pool operation. However, this is done at the expense of power and processing time.

The algorithms described with reference to FIGS. 6 and 7 are not the only ones that can be used. In some examples, rather than summing the values, the number of non-zero values in the neighbouring regions are counted. Zero values in the neighbouring region cannot lead to an output value being produced and so are neither indicate the presence of absence of a feature. They are therefore uninteresting. A neighbouring region that contains a lot of zeros is therefore unlikely to say anything and so it is less likely to be taken by a max-pool operation.

Another option is to use metadata. The metadata might dictate a particular mask to use, or might otherwise influence the mask that is to be used. In some examples, the metadata can act as a complete replacement for the mask. For instance, the metadata could indicate an average (mean, mode, or medium) or other distribution of the IFM. Such distributions could be used to indicate bigger or smaller than usual IFMs.

Rather than merely summing weights, the weights could be treated separately depending on whether they are positive or negative. For instance, positive weights could be summed, and negative weights could be summed (separately) and the prediction could be based on the sum of the positive weights minus the sum of the negative weights. In some examples, weights are placed into 'bins' depending on their sizes (each bin covering a different range of values. Each weight is scaled according to the bin it is placed into and then the scaled weights are added together.

A still further option is to use a small magnitude prediction neural network to analyse the neighbouring regions.

That is to say that a neural network could be trained to predict, from the neighbouring regions, which neighbouring region was likely to be taken forward by a later max-pool operation. Clearly such a neural network would have to be small in comparison to the neural network for which convolution is occurring—otherwise there would be no point to it. However, a neural network might have the advantage that, for instance, it is almost always possible to tell which neighbouring region will be taken forward by a max-pool operation by considering only a single value across all channels. This might be the case if, for instance, the combination of the kernel value in that location and the corresponding value in the neighbouring region regularly dwarfed all other values that were produced through convolution.

Figure 9:
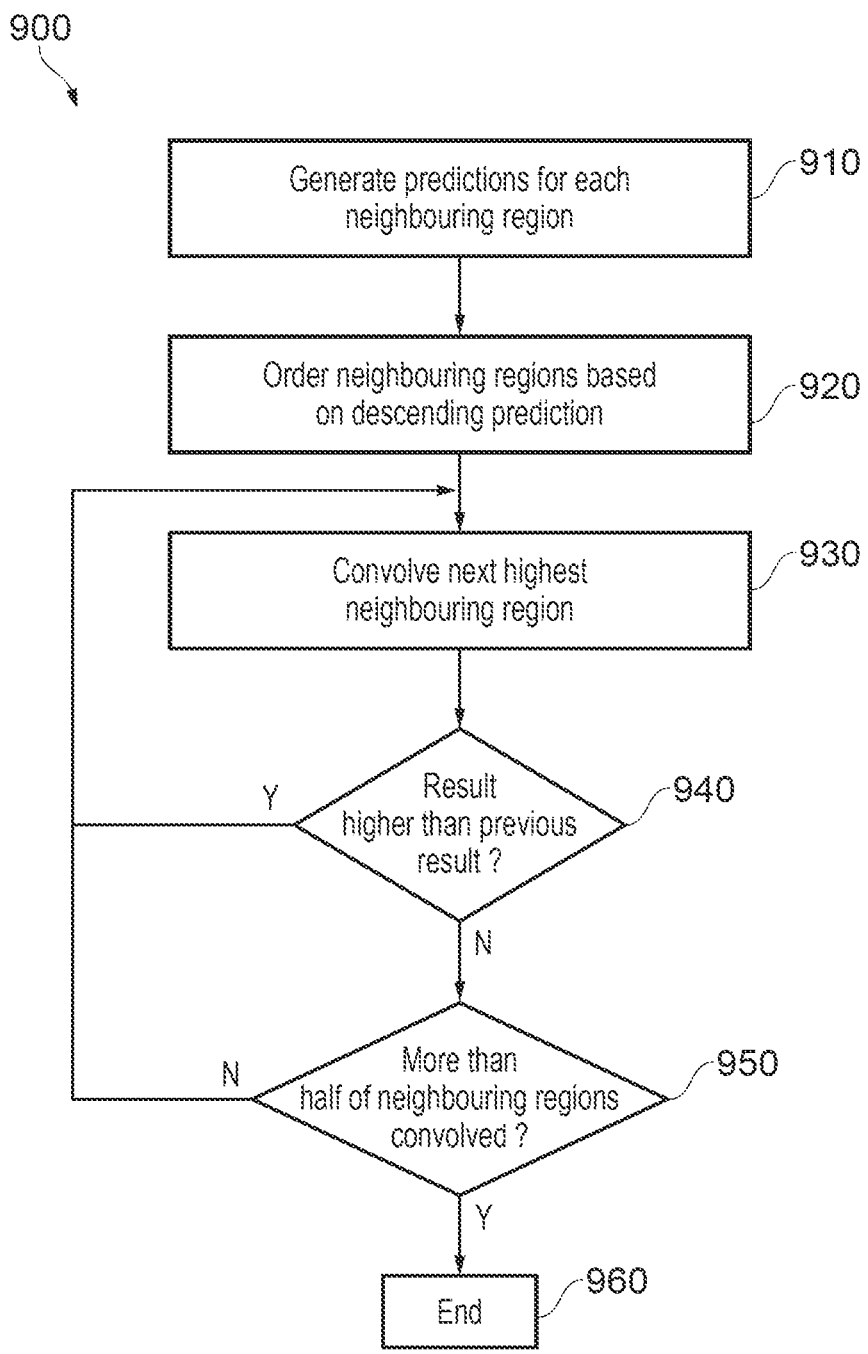
FIG. 9 shows a flowchart in which ordering is used to convolve some of the neighbouring regions.

FIG. 9 shows a flowchart 900 in which ordering is used to convolve some of the neighbouring regions. At a step 910, predictions are generated as per FIGS. 6 and 7 for instance. At a step 920, the neighbouring regions are ordered based on the prediction values descending so that the highest prediction corresponds with the first neighbouring region in the order. At step 930, the next highest neighbouring region in the order is fully convolved (e.g. across all channels). Then at step 940, it is determined whether the actual result is higher than the previous result. In other words, step 940 determines whether the order has been correct at any point. If so, then the process returns to step 930. Otherwise, at step 950, it is determined whether over half of the neighbouring regions have been fully convolved. If not, then again the process returns to step 930. Otherwise, the process ends at step 960.

In this example, neighbouring regions are convolved until half of the neighbouring regions have been convolved (of course, other fractions can also be used). However, the process will continue past this point if the ordering appears to be incorrect, since this is indicative that a next neighbouring region could theoretically still produce the best result (albeit with decreasing likelihood).

Figure 10:
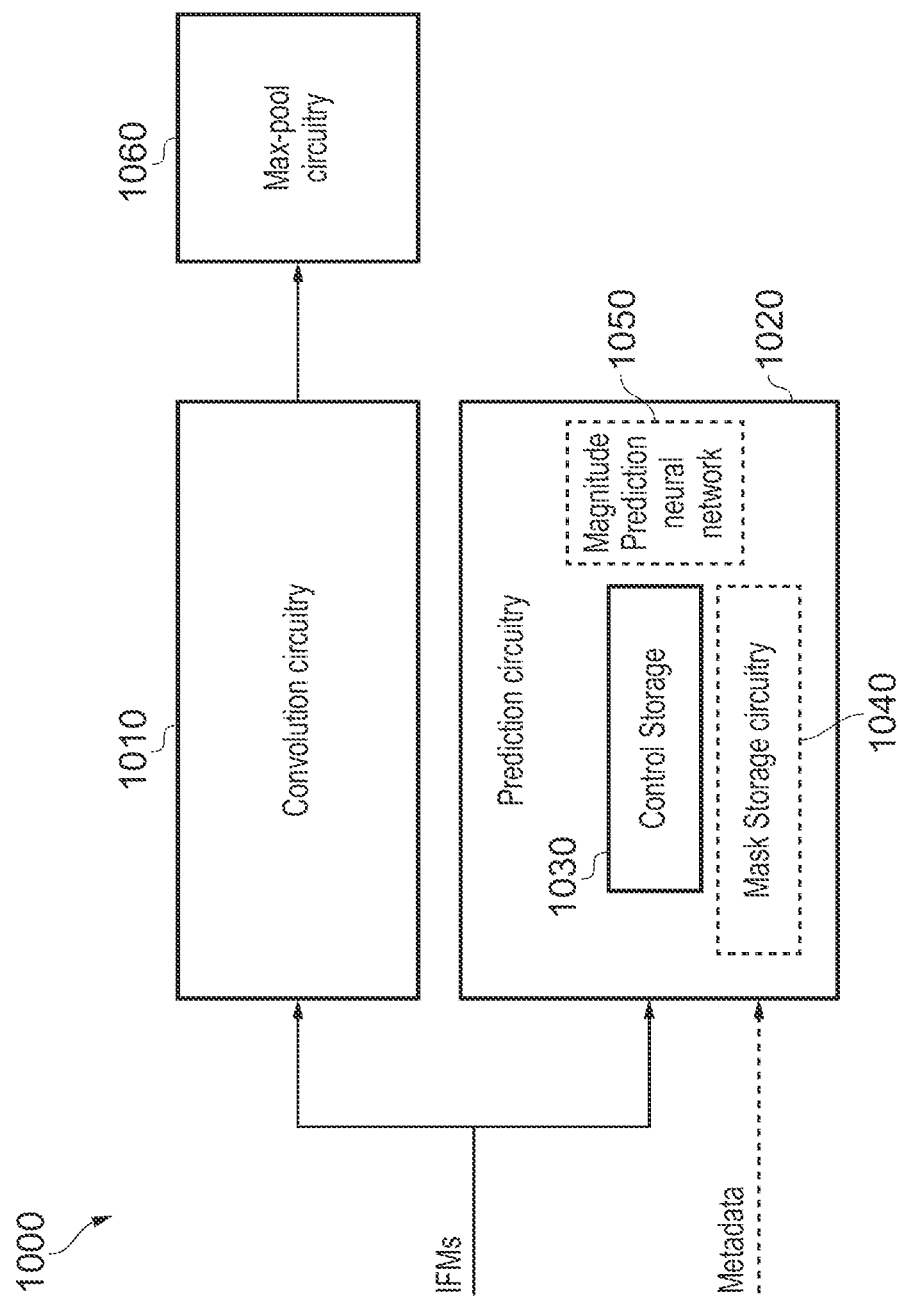
FIG. 10 illustrates a data processing apparatus.

FIG. 10 illustrates a data processing apparatus 1000. The data processing apparatus include convolution circuitry 1010 that performs convolutions and max-pool circuitry 1060 that takes the results of the convolutions to perform max-pooling. These could, of course, be performed using a general purpose Central Processing Unit (CPU) but could also be processed using a Graphics Processing Units (GPU) or Neural Processing Unit (NPU). Prediction circuitry 1020 is used to perform a prediction on the convolution process performed by the convolution circuitry 1010 in order to determine which value will be taken forward by the max-pool circuitry 1060. This prediction is made for a neighbouring region before convolution occurs on that neighbouring region (although further later predictions may occur after some convolution has occurred). The predictions could take place by means of a mask stored in mask storage circuitry 1040, which may be generated from the kernel (and indeed, since such kernels are known ahead of time, the masks can be precompiled). The prediction could also be made by the means of metadata provided to the prediction circuitry 1020 or by a magnitude prediction neural network 1050. Control storage 1030 is provided in order to store parameters that can affect, for instance, the sensitivity of the prediction, the tradeoff between prediction accuracy and energy savings, and other parameters used in the prediction process for instance.

By means of the above technique it is possible to reduce energy consumption and processing time expended on convolution of values that are not taken forward by max-pooling processes and therefore 'wasted'.

Concepts described herein may be embodied in computer-readable code for fabrication of an apparatus that embodies the described concepts. For example, the computer-readable code can be used at one or more stages of a semiconductor design and fabrication process, including an electronic design automation (EDA) stage, to fabricate an integrated circuit comprising the apparatus embodying the concepts. The above computer-readable code may additionally or alternatively enable the definition, modelling, simulation, verification and/or testing of an apparatus embodying the concepts described herein.

For example, the computer-readable code for fabrication of an apparatus embodying the concepts described herein can be embodied in code defining a hardware description language (HDL) representation of the concepts. For example, the code may define a register-transfer-level (RTL) abstraction of one or more logic circuits for defining an apparatus embodying the concepts. The code may be define a HDL representation of the one or more logic circuits embodying the apparatus in Verilog, SystemVerilog, Chisel, or VHDL (Very High-Speed Integrated Circuit Hardware Description Language) as well as intermediate representations such as FIRRTL. Computer-readable code may provide definitions embodying the concept using system-level modelling languages such as SystemC and SystemVerilog or other behavioural representations of the concepts that can be interpreted by a computer to enable simulation, functional and/or formal verification, and testing of the concepts.

Additionally or alternatively, the computer-readable code may embody computer-readable representations of one or more netlists. The one or more netlists may be generated by applying one or more logic synthesis processes to an RTL representation. Alternatively or additionally, the one or more logic synthesis processes can generate from the computer-readable code a bitstream to be loaded into a field programmable gate array (FPGA) to configure the FPGA to embody the described concepts. The FPGA may be deployed for the purposes of verification and test of the concepts prior to fabrication in an integrated circuit or the FPGA may be deployed in a product directly.

The computer-readable code may comprise a mix of code representations for fabrication of an apparatus, for example including a mix of one or more of an RTL representation, a netlist representation, or another computer-readable definition to be used in a semiconductor design and fabrication process to fabricate an apparatus embodying the invention. Alternatively or additionally, the concept may be defined in a combination of a computer-readable definition to be used in a semiconductor design and fabrication process to fabricate an apparatus and computer-readable code defining instructions which are to be executed by the defined apparatus once fabricated.

Such computer-readable code can be disposed in any known transitory computer-readable medium (such as wired or wireless transmission of code over a network) or non-transitory computer-readable medium such as semiconductor, magnetic disk, or optical disc. An integrated circuit fabricated using the computer-readable code may comprise components such as one or more of a central processing unit, graphics processing unit, neural processing unit, digital signal processor or other components that individually or collectively embody the concept.

In the present application, the words "configured to . . . " are used to mean that an element of an apparatus has a configuration able to carry out the defined operation. In this context, a "configuration" means an arrangement or manner of interconnection of hardware or software. For example, the apparatus may have dedicated hardware which provides the defined operation, or a processor or other processing device may be programmed to perform the function. "Configured to" does not imply that the apparatus element needs to be changed in any way in order to provide the defined operation.

Although illustrative embodiments of the invention have been described in detail herein with reference to the accompanying drawings, it is to be understood that the invention is not limited to those precise embodiments, and that various changes, additions and modifications can be effected therein by one skilled in the art without departing from the scope and spirit of the invention as defined by the appended claims. For example, various combinations of the features of the dependent claims could be made with the features of the independent claims without departing from the scope of the present invention.

We claim:

1. A data processing apparatus configured to perform machine learning comprising:
   convolution circuitry configured to convolve a plurality of neighbouring regions of input data using a kernel to produce convolution outputs;
   max-pooling circuitry configured to determine and select the largest of the convolution outputs as a pooled output; and
   prediction circuitry configured to perform a size prediction of the convolution outputs based on the neighbouring regions, wherein the size prediction is performed prior to the max-pooling circuitry determining the largest of the convolution outputs and to adjust a behaviour of the convolution circuitry based on the size prediction, wherein
   the prediction circuitry is configured to predict a size order of the convolution outputs; and
   the prediction circuitry is configured to adjust the behaviour of the convolution circuitry based on the size prediction by causing the convolution circuitry to convolve the plurality of neighbouring regions based on the size order descending.

2. The data processing apparatus according to claim 1, wherein
   the prediction comprises a predicted largest of the convolution outputs; and
   the prediction circuitry is configured to adjust the behaviour of the convolution circuitry based on the size prediction by an inhibition of the convolution circuitry from convolving at least some of the plurality of neighbouring regions other than the predicted largest of the convolution outputs.

3. The data processing apparatus according to claim 2, comprising:
   control storage configured to store a control value to control the extent of the inhibition.

4. The data processing apparatus according to claim 2, comprising:
   mask storage circuitry to store a mask that indicates entries of the kernel that are at least one of: above a first threshold or below a second threshold, wherein
   the prediction circuitry is configured to apply the mask to the neighbouring regions and to perform the size prediction of the convolution outputs prior to the max-pooling for a given neighbouring region based on the mask.

5. The data processing apparatus according to claim 4, wherein
   the prediction circuitry is configured to perform the size prediction by summing those parts of the given neighbouring region that are above the first threshold and those parts of the neighbouring region that are below the second threshold.

6. The data processing apparatus according to claim 1, wherein
   the prediction circuitry is configured to adjust the behaviour of the convolution circuitry based on the size prediction by halting convolution of a given one of the neighbouring regions when it is determined that a probability of the given one of the neighbouring regions producing the largest of the convolution outputs is below a threshold.

7. The data processing apparatus according to claim 6, comprising:
   control storage configured to store a control value to control the threshold.

8. The data processing apparatus according to claim 6, wherein
   the input data is divided into a plurality of channels; and
   the convolution circuitry is configured to perform convolution for a set of the channels of one of the neighbouring regions before performing convolution for the channels of other of the neighbouring regions.

9. The data processing apparatus according to claim 8, wherein
   the probability of the given one of the neighbouring regions producing the largest of the convolution outputs is determined according to those of the channels that have been convolved for the given one of the neighbouring regions.

10. The data processing apparatus according to claim 8, wherein
    the probability of the given one of the neighbouring regions producing the largest of the convolution outputs is determined according to convolution previously performed in respect of a previous one of the neighbouring regions.

11. The data processing apparatus according to claim 10, wherein
    the previous one of the neighbouring regions is one for which the prediction circuitry predicts that the largest of the convolution outputs will be produced.

12. The data processing apparatus according to claim 10, wherein
    the previous one of the neighbouring regions is one for which the prediction circuitry predicts that the largest of the convolution outputs will be produced; and
    the probability of the given one of the neighbouring regions producing the largest of the convolution outputs is determined according to a comparison between a previous partial convolution output for a previous one of the neighbouring regions and a current partial convolution output for the given one of the neighbouring regions.

13. The data processing apparatus according to claim 8, wherein
    the prediction circuitry is configured to halt convolution of the given one of the neighbouring regions in response to a partial result of one of the convolution outputs of the given one of the neighbouring regions after processing a number of the channels being less than a partial result of another of the convolution outputs of a previous one of the neighbouring regions after processing the number of channels.

14. The data processing apparatus according to claim 8, wherein
the prediction circuitry is configured to halt convolution of the given one of the neighbouring regions in response to a partial result of one of the convolution outputs of the given one of the neighbouring regions after processing a number of the channels being within a threshold of a partial result of another of the convolution outputs of a previous one of the neighbouring regions after processing the number of channels.

15. The data processing apparatus according to claim 10, wherein
the prediction circuitry is configured to halt convolution of the given one of the neighbouring regions based on a reachability determination of whether one of the convolution outputs of the given one of the neighbouring regions is able to reach another of the convolution outputs of the previous one of the neighbouring regions after processing a number of the channels.

16. The data processing apparatus according to claim 15, wherein
the prediction circuitry is configured to perform the reachability determination by counting a number of non-zeros in the channels that have not yet been processed for the given one of the neighbouring regions.

17. The data processing apparatus according to claim 1, wherein
the prediction circuitry is configured to determine the size prediction by using a magnitude prediction neural network to analyse the neighbouring regions.

18. A method of performing machine learning comprising:
convolving a plurality of neighbouring regions of input data using a kernel to produce convolution outputs;
determining and selecting the largest of the convolution outputs as a pooled output;
performing, prior to determining the largest of the convolution outputs, a size prediction of the convolution outputs based on the neighbouring regions; and
adjusting the convolving based on the size prediction, wherein
the size prediction is a prediction of a size order of the convolution outputs; and
the convolving is adjusted based on the size prediction by convolving the plurality of neighbouring regions based on the size order descending.

19. A non-transitory computer-readable medium to store computer-readable code for fabrication of a data processing apparatus configured to perform machine learning comprising:
convolution circuitry configured to convolve a plurality of neighbouring regions of input data using a kernel to produce convolution outputs;
max-pooling circuitry configured to determine and select the largest of the convolution outputs as a pooled output; and
prediction circuitry configured to perform a size prediction of the convolution outputs based on the neighbouring regions, wherein the size prediction is performed prior to the max-pooling circuitry determining the largest of the convolution outputs and to adjust a behaviour of the convolution circuitry based on the size prediction, wherein
the prediction circuitry is configured to predict a size order of the convolution outputs; and
the prediction circuitry is configured to adjust the behaviour of the convolution circuitry based on the size prediction by causing the convolution circuitry to convolve the plurality of neighbouring regions based on the size order descending.

* * * * *